United States Patent [19]

Calder

[11] 3,747,310
[45] July 24, 1973

[54] HAY CONDITIONER DRIVE
[75] Inventor: Robert A. C. Calder, Hamilton, Ontario, Canada
[73] Assignee: International Harvester Company, Chicago, Ill.
[22] Filed: Dec. 1, 1971
[21] Appl. No.: 203,678

[52] U.S. Cl. .................................. 56/1, 56/DIG. 1
[51] Int. Cl. ..................................................... A01d
[58] Field of Search ..................... 56/1, DIG. 1, 14.3, 56/14.4

[56] References Cited
UNITED STATES PATENTS
2,963,841  12/1960  Cunningham .................... 56/DIG. 1
2,989,830  6/1961   Pristo .............................. 56/DIG. 1
3,146,569  9/1964   Hale et al. ....................... 56/DIG. 1

Primary Examiner—Russell R. Kinsey
Attorney—Floyd B. Harman

[57] ABSTRACT

A crop harvesting platform including a pair of crop conditioner rolls for crimping or crushing hay therebetween to facilitate curing or drying of the crop. One of the rolls is mounted for movement toward and away from the other roll to accommodate varying thickness of the crop passing between the rolls. The rolls are power driven by a system including a flexible drive chain and a movable idler sprocket operable to vary the path of travel of the chain in response to movement of the movable roll relative to the other roll.

12 Claims, 3 Drawing Figures

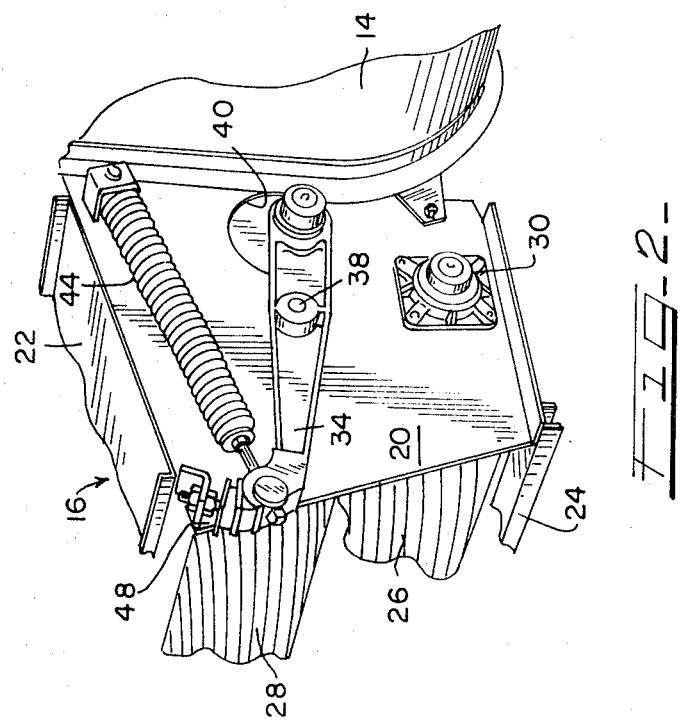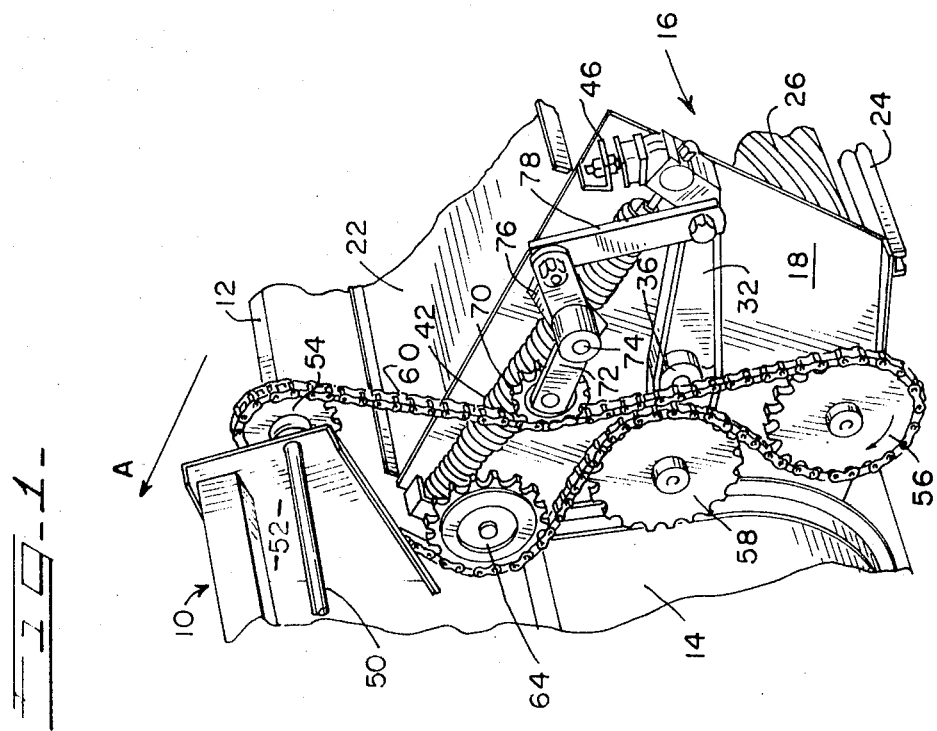

3,747,310

HAY CONDITIONER DRIVE

BACKGROUND OF THE INVENTION

1. Field of the Invention

The invention relates generally to hay conditioners and more particularly, to an improved drive system for a pair of hay conditioner rolls.

2. Prior Art

U.S. Pat. No. 3,146,569 describes some of the problems associated with hay conditioners. In addition to the problem of varying the path of travel of the chain in response to movement of one roll relative to the other, are those resulting from fluctuations in input drive speeds and direction of drive forces on the drive chain relative to the axis about which the movable roll is mounted for shifting or pivoting movement.

In the case where the hay conditioner is a part of a more complex machine such as a windrower platform including cutters, reels, conveyors and the like, the speed of the drive input to the conditioner may be subjected to variations caused by the operation of the cutter, for example. The fluctuations in the speed of the drive chain are resisted by the rapidly rotating conditioner rolls causing the chain to whip and chatter.

Whether the hay conditioner is used separately or in conjunction with other operative structure such as a windrower, it has been discovered that the disposition of the drive chain relative to the pivot axis of the movable roll can create serious operating problems. In driving the rolls, the line of force of the chains can create a moment tending to quickly shift or move the movable roll away from the fixed roll when such movement is undesired or unnecessary. Since the movable roll is normally spring biased toward a position close to the fixed roll, this quick movement is resisted by the spring force with the result that the roll is suddenly pulled back toward the fixed roll. This rapid "hammering" action can cause damage to the conditioner, particularly to the structure providing a position stop for the movable roll.

SUMMARY

The invention provides an improved hay conditioner wherein the drive system is arranged to minimize the creation of moments tending to undesirably move the movable roll relative to the fixed roll. The drive system further includes means for increasing the effective length of the "tight" or drive side of the chain in response to movement of the movable roll away from the fixed roll as crop material of increased thickness passes between the rolls.

The chain is arranged such that the lines of force acting on the drive sprocket of the movable roll are directed close to the pivot axis of the roll thereby minimizing moments about the axis. Changes in the effective length of the tight side of the chain created by movement of the movable roll are provided by an idler structure movably operable on the chain in response to the movement of the roll.

Briefly, the objects of the invention are to provide a hay conditioner with a drive system which minimizes the adverse effects of: speed fluctuations, directions of drive force application, and variations in the thickness of the crop material passing between the rolls of the conditioner.

BRIEF DESCRIPTION OF THE DRAWINGS

FIG. 1 is a fragmentary perspective view of one end of the hay conditioner showing the drive system therefor;

FIG. 2 is a fragmentary perspective view of the opposite end of the hay conditioner; and, FIG. 3 is a diagrammatic view of the drive system of the hay conditioner illustrating the range of movement of the movable roll and the movable idler structure.

DESCRIPTION OF THE PREFERRED EMBODIMENT

Figure 3:
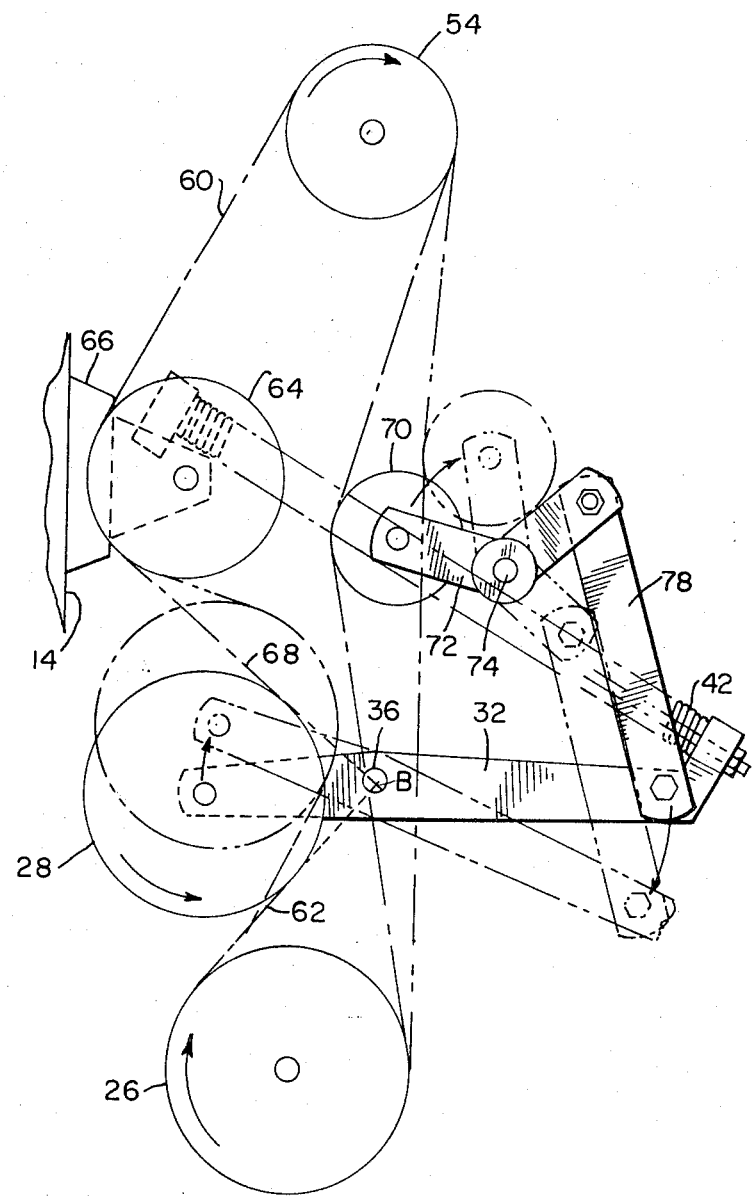

FIG. 1 shows a portion of a conventional harvester platform 10 for a windrower, mower-conditioner, or the like. The numeral 12 designates the upper rear edge of the platform which extends transversely to the forward direction of travel of the platform shown by the arrow A. A rear wall 14 extends downwardly from the edge 12 as shown.

Secured to the rear wall 14 of the platform 10 is a hay conditioner unit 16 which, in accordance with conventional practice, spans a crop discharge opening (not shown) defined through the rear wall 14. The conditioner unit 16 includes a pair of end walls 18 and 20 shown in FIGS. 1 and 2, respectively. A top wall 22 extends between the tops of the end walls 18 and 20 and a brace 24 extends between the bottom rear edges of the end walls as shown.

Spanning the distance between the end walls 18 and 20 and arranged to crush or crimp a crop material therebetween is a pair of cylindrical conditioner rolls 26 and 28 of conventional construction. The lowermost roll 26 is journaled at its ends in fixed relation to the end walls 18 and 20. One of the bearing assemblies for the roll 26 is shown at 30 in FIG. 2.

The upper roll 28 is adapted for movement toward and away from the lower roll 26. The roll 28 is journaled at its oppsite ends on a pair of arms 32 and 34 mounted on the end walls 18 and 20, respectively. The arms 32 and 34 are pivotally connected to the respective end walls by coaxial pivot mountings 36 and 38 which define a transverse horizontal pivot axis for the arms. The roll 28 is journaled on the forward end of the arms 32 and 34. An opening, such as shown at 40 in FIG. 2, is defined through each end wall 18 and 20 to accommodate movement of the roll 28 and arms 32 and 34 about the pivot axis defined by the mountings 36 and 38.

In accordance with common practice, structure is provided to resiliently bias the movable roll 28 toward the fixed roll 26. A coil spring unit 42 is connected between the end wall 18 and the rearward end of the arm 32. Similarly, as shown in FIG. 2, a coil spring unit 44 is connected between the end wall 20 and the arm 34. The spring units 42 and 44 are operative in tension to bias the roll 28 downwardly toward the roll 26. Suitable abutment stop structures 46 and 48 are mounted on the respective end walls 18 and 20 for engagement by the respective arms 32 and 34. The stop structures are adjustable so that the normal spacing between the rolls may be predetermined.

In accordance with the invention, a drive system is provided for rotating the conditioner rolls rapidly in opposite directions so as to crush or crimp the crop material received from the harvester platform. The power is, of course, provided from the engine of the tractor pulling the harvester platform or the engine of the self-propelled chassis upon which the platform may be mounted. A power input shaft 50 is journaled through a mounting plate 52 extending rearwardly from the platform wall 14. A drive sprocket 54 is mounted on the end of the shaft 50 as shown. A sprocket 56 is keyed to the end of the lower roll 26 and a sprocket 58 is similarly keyed to the end of the upper roll 28. It will be understood that the sprockets 54, 56 and 58 are disposed in a common vertical plane spaced outwardly from the end wall 18.

An endless flexible drive chain 60 of the roller-type is trained about the sprockets so as to extend downwardly from the sprocket 54 to the sprocket 56 in a slackside run and upwardly from the sprocket 56 to the sprocket 54 in engagement with the sprocket 58 in a tight-side run. It will be seen that the chain 60 engages the sprockets 56 and 58 such that the rolls 26 and 28 will be rotated in opposite directions. The chain 60 extends between the sprockets 56 and 58 in a straight line span designated as 62 in FIG. 3.

An idler sprocket 64 is journaled on a bracket 66 (FIG. 3) secured to the wall 14. The idler sprocket 64 engages the tight-side run of the chain 60 between the sprockets 54 and 58. As shown diagrammatically in FIG. 3, the tight-side run of the chain 60 extends between the idler 64 and sprocket 58 in a straight line span designated as 68. Referring to FIG. 3, it will be seen that the spans 62 and 68 define respective straight lines which, when extended, intersect at a point B which is at, or very close to, the pivot axis of the arms 32 and 34 defined by the center of the pivot mountings 36 and 38. It will be noted that the above relationship exists when the upper roll 28 is in its lowermost position, that is, the position for normal operation.

The overall geometry of the drive system of the invention is such that upward movement of the roll 28 will require an increase in the length of the chain in the tight-side run, that is, the extent of chain from the lower roll 26 to the drive sprocket 54 which includes the spans 62 and 68. Consequently, the system must be capable of varying the effective length of the tight-side run in response to movement of the roll 28 toward and away from the lower roll 26.

As shown in FIG. 1, an idler sprocket 70 is maintained in engagement with the slack-side run of the chain 60 approximately midway between the drive sprocket 54 and the driven sprocket 56. The sprocket 70 is journaled on the forward end of a bellcrank 72 which is pivotally mounted at 74 to a bracket 76. The bracket 76 is secured to the end wall 18. Pivotally connected to the rearward end of the bellcrank 72 is a link 78 which extends downwardly into pivotal connection with the rearward end of the arm 32.

In operation, the input shaft 50 is powered to move the chain 60 in the direction of the arrows in FIG. 3. The rolls 26 and 28 are thus rotated in opposite directions so as to crush or crimp crop material therebetween received from the harvester platform. it will be seen that drive forces acting along the chain in the spans 62 and 68 will be directed toward the point B. Since this point is very close to the pivot axis of the roll 28, it will be seen that no significant moments are created tending to move the roll 28 about the axis. Thus, it will be appreciated that during normal operation with the roll 28 in its usual lowermost position, the power for driving the rolls will not induce significant movement of the roll 28. In other words, the roll 28 will move upwardly only in response to an increase in the thickness of the crop material being crushed.

If such an increase in crop thickness is encountered, the roll 28 moves upwardly about the pivot axis of the arms 32 and 34. As shown in FIG. 3, the rearward end of the arm 32 moves downwardly. The interconnected link 78 thus pivots the bellcrank 72 about its pivot mounting 74. The idler sprocket 70 on the bellcrank is thus moved rearwardly to relieve tension on the slack-side run and, in effect, decrease its effective length. The path of travel of the slack-side run is thus variable between the two paths shown in FIG. 3. Accordingly, additional chain length is provided to accommodate the requirement for additional chain length on the tight-side run created by the upward movement of the roll 28. It will, of course, be seen that the spring units 42 and 44 will be effective to return the roll 28 toward its lowermost position as the thickness of the crop decreases.

What is claimed is:

1. In a drive system including a supporting framework, a pair of crop conditioning rolls disposed in parallel relation one above the other on said framework, a pair of arms pivotally mounted on said framework about a horizontal pivot axis, the upper one of said rolls being mounted at its opposite ends on said arms so that the upper roll may move downwardly toward and upwardly away from the lower of said rolls, wherein the improvement comprises:
   a drive sprocket on said framework above an end of said rolls;
   a first driven sprocket on said lower roll and a second driven sprocket on said upper roll, said driven sprockets being disposed in a vertical plane common with said drive sprocket;
   an endless drive chain trained about said drive sprocket and extending downwardly in first and second runs so as to be trained about said first driven sprocket, said first run engaging said second driven sprocket so that said rolls are rotated in opposite directions for conveying crop material therebetween;
   an idler sprocket on said framework engaging said first run between said second driven sprocket and said drive sprocket so that the portion of said first run disposed between said idler sprocket and said second driven sprocket defines a straight line extending proximate to said pivot axis;
   and means operatively related between one of said arms and said second run for relieving tension on said chain in response to upward movement of said upper roll.

2. The subject matter of claim 1, wherein said means includes a bellcrank pivoted on said framework, a second idler sprocket mounted on said bellcrank in rollable engagement with said second run, and a link connected between said one arm and said bellcrank, whereby pivotable movement of said one arm as said upper roll moves upwardly causes said link and bellcrank to move said second idler sprocket in a direction away from said second run.

3. In a drive system including a supporting framework, a pair of crop conditioning rolls disposed in parallel relation one above the other on said framework, a pair of arms pivotally mounted on said framework about a horizontal pivot axis disposed intermediate the ends of said arms, the upper one of said rolls being mounted at its opposite ends on said arms so that the upper roll may move downwardly toward and upwardly away from the lower of said rolls in response to conjoint pivotal movement of said arms about said pivot axis, an input drive member journaled on said framework above an end of said rolls, a first driven member mounted on an end of said lower roll, a second driven member mounted on an end of said upper roll, said drive member and said driven members being disposed in a common plane, and an endless flexible drive element trained about said input drive member and said first driven member so as to extend therebetween in first and second runs, said first run engaging said second driven member such that said rolls are rotated in opposite directions, wherein the improvement comprises:

a first idler journaled on said framework in engagement with said first run between said input drive member and said second driven member so that the portion of said first run disposed between said idler and said second driven member is disposed along a straight line extending proximate to said pivot axis when said upper roll is in its lowermost position;

movable idler means engaging said second run;

and means operatively associated with one of said arms and said movable idler means for moving said idler means in a direction away from said second run in response to upward movement of said upper roll, thereby permitting said second run to decrease in effective length so that said first run may increase in effective length to accommodate upward movement of said upper roll.

4. In a drive system including a supporting framework, a pair of crop conditioning rolls disposed in parallel relation one above the other on said framework, a pair of arms pivotally mounted on said framework about a horizontal pivot axis, the upper one of said rolls being mounted at its opposite ends on said arms so that the upper roll may move downwardly toward and upwardly away from the lower of said rolls, wherein the improvement comprises:

a drive sprocket on said framework above an end of said rolls;

a first driven sprocket on said lower roll and a second driven sprocket on said upper roll, said driven sprockets being disposed in a vertical plane common with said drive sprocket;

an endless drive element trained about said drive sprocket and said first driven sprocket so as to extend therebetween in a tight-side run and a slack-side run, said tight-side run engaging said second driven sprocket so that said rolls are rotated in opposite directions for moving crop material therebetween, said tight-side run extending between said first and second driven sprockets in a first span defining a straight line extending proximate to said pivot axis;

an idler sprocket on said framework in engagement with said tight-side run between said second driven sprocket and said drive sprocket, said tight-side run extending between said idler sprocket and said second driven sprocket in a second span defining a straight line extending proximate to said pivot axis, whereby driven forces on said first and second spans extend proximate to said pivot axis to thereby prevent creation of significant moments which tend to move said uppe roll away from said lower roll.

5. The subject matter of claim 4, including means operatively related between one of said arms and said slack-side run for decreasing the length of said slack-side run to provide additional length to said tight-side run in response to movement of said upper roll away from said lower roll.

6. The subject matter of claim 5, wherein said means includes a movable idler in engagement with said slack-side run, said movable idler being journaled on a bell-crank which is pivotally supported on said framework, a link pivotally interconnecting said bell-crank and said one arm, whereby pivotal movement of said one arm about said pivot axis as said upper roll moves away from said lower roll is effective to move said movable idler in a direction away from said slack-side run to thereby decrease the length thereof.

7. In a crop conditioner including a framework, a pair of crop conditioner rolls journaled on said framework in parallel relation one above the other for crushing crop material conveyed therebetween, the upper roll being mounted for movement about a pivot axis toward and away from the lower roll to accommodate crop material of varying thickness, an improved drive system comprising:

an input drive member journaled on said framework;

an endless flexible drive element operably interconnecting said input drive member with said rolls for driving the rolls in opposite directions, said flexible drive element extending from the lower roll to the upper roll in a first span;

an idler journaled on said framework in engagement with said flexible drive element, said flexible drive element extending from said idler to the upper roll in a second span, said first and second spans defining respective straight lines inersecting proximate to said pivot axis, whereby drive forces acting along the straight lines are effective proximate to said pivot axis thereby minimizing moments about said pivot axis.

8. The subject matter of claim 7, including means operatively associated between said upper roll and said flexible drive element to vary the path of travel of said drive element in response to movement of said upper roll about said pivot axis.

9. In a drive system including a framework, a pair of parallel crop conditioner rolls journaled on said framework, an endless flexible drive element for rotating the rolls in opposite directions to crush crop material passing therebetween, one of said rolls being mounted for movement about a pivot axis toward and away from the other of said rolls to accommodate crop material of varying thickness, wherein the improvement comprises:

a rotatable element journaled on said framework in engagement with said flexible drive element, said flexible drive element extending from said rotatable element to said movable roll in a given span, said flexible drive element extending from said other roll to said movable roll in another span, said spans defining respective straight lines intersecting proximate to said pivot axis whereby drive forces acting along the straight lines are effective proximate to said pivot axis to minimize moments about said pivot axis.

10. The subject matter of claim 9, including means operatively associated between said movable roll and said flexible drive element to vary the path of travel of said drive element in response to movement of said movable roll about said pivot axis.

11. The subject matter of claim 10, wherein said means includes an idler in engagement with said flexible drive element, a bellcrank mounted on said framework, said idler being journaled on said bell-crank, a link connected to said bellcrank, an arm supporting said movable roll for movement about said pivot axis, and said link being connected to said arm, whereby movement of said movable roll toward and away from said other roll is effective to move said idler in directions toward and away from said flexible drive element.

12. In a crop conditioner including a framework, a pair of crop conditioner rolls journaled on said framework in parallel relation one above the other for crushing crop material conveyed therebetween, the upper roll being mounted for movement about a pivot axis toward and away from the lower roll to accommodate crop material of varying thickness, an improved drive system comprising:

an input drive member journaled on said framework;
an endless flexible drive element trained about said input drive member and said lower roll so as to extend therebetween in a tight-side run and a slack-side run;
an idler journaled on said framework in engagement with said tight-side run, said upper roll engaging said tight-side run between said lower roll and said idler such that the tight-side run extends between said lower roll and said upper roll in a first span and between said upper roll and said idler in a second span, said spans defining respective straight lines intersecting at a point proximate to said pivot axis, whereby drive forces acting along the straight lines are effective at said point to thereby minimize moments about said pivot axis.

* * * * *